(12) United States Patent
Berthold et al.

(10) Patent No.: US 7,743,661 B2
(45) Date of Patent: Jun. 29, 2010

(54) FIBER OPTIC MEMS SEISMIC SENSOR WITH MASS SUPPORTED BY HINGED BEAMS

(75) Inventors: John W. Berthold, Salem, OH (US); Tiansheng Zhou, Edmonton (CA); Ira Jeffrey Bush, Van Nuys, CA (US); Fred McNair, Van Nuys, CA (US)

(73) Assignee: Halliburton Energy Services, Inc., Carrollton, TX (US)

( * ) Notice: Subject to any disclaimer, the term of this patent is extended or adjusted under 35 U.S.C. 154(b) by 491 days.

(21) Appl. No.: 11/705,224

(22) Filed: Feb. 12, 2007
(Under 37 CFR 1.47)

(65) Prior Publication Data
US 2009/0056447 A1 Mar. 5, 2009

Related U.S. Application Data

(60) Provisional application No. 60/794,948, filed on Apr. 26, 2006.

(51) Int. Cl.
*G01H 9/00* (2006.01)
(52) U.S. Cl. ............... 73/653; 73/514.26; 356/482
(58) Field of Classification Search ........... 73/514.26, 73/514.27, 653, 657; 356/482
See application file for complete search history.

(56) References Cited

U.S. PATENT DOCUMENTS

| | | | |
|---|---|---|---|
| 1,432,149 A | 10/1922 | Bellingham | |
| 3,923,400 A | 12/1975 | Hardy | |
| 4,210,029 A | 7/1980 | Porter | |
| 4,329,058 A | 5/1982 | James | |
| 4,393,714 A | 7/1983 | Schmidt | |
| 4,418,981 A | 12/1983 | Stowe | |
| 4,428,239 A | 1/1984 | Johnston | |
| 4,572,669 A | 2/1986 | James | |
| 4,576,479 A | 3/1986 | Downs | |
| 4,583,228 A | 4/1986 | Brown | |

(Continued)

FOREIGN PATENT DOCUMENTS

DE 3127333 A1 1/1983

(Continued)

OTHER PUBLICATIONS

Int'l Search Report, Dec. 12, 2007, Davidson Instruments, Inc.

(Continued)

*Primary Examiner*—John E Chapman
(74) *Attorney, Agent, or Firm*—Booth Albanesi Schroeder LLC; Peter V. Schroeder

(57) ABSTRACT

The present invention relates to an optic seismic MEMS sensor. More specifically, a proof mass is supported by a frame having supporting beams. The proof mass is positioned within the frame and has a hinged attachment to the beams. The proof mass has a sensor gap having a first reflector and a second reflector positioned at opposing ends of the sensor gap. An optical fiber injects light into the sensor gap and light is reflected to determine seismic movement of the proof mass with respect to the frame. Stops are provided for limiting the movement of the proof mass to minimize strain on the attachment of the beams and the proof mass.

20 Claims, 8 Drawing Sheets

U.S. PATENT DOCUMENTS

| | | | |
|---|---|---|---|
| 4,596,466 A | 6/1986 | Ulrich | |
| 4,606,638 A | 8/1986 | Sommargren | |
| 4,628,211 A | 12/1986 | Ruppert | |
| 4,640,616 A | 2/1987 | Michalik | |
| 4,647,203 A | 3/1987 | Jones | |
| 4,648,083 A | 3/1987 | Giallorenzi | |
| 4,668,889 A | 5/1987 | Adams | |
| 4,678,909 A | 7/1987 | Jackson | |
| 4,729,654 A | 3/1988 | Akuta | |
| 4,755,668 A | 7/1988 | Davis | |
| 4,772,786 A * | 9/1988 | Langdon | 250/231.1 |
| 4,777,358 A | 10/1988 | Nelson | |
| 4,787,741 A | 11/1988 | Udd | |
| 4,806,016 A | 2/1989 | Corpron | |
| 4,844,616 A | 7/1989 | Kulkarni | |
| 4,873,989 A | 10/1989 | Einzig | |
| 4,907,035 A | 3/1990 | Galburt | |
| 4,914,666 A | 4/1990 | Glance | |
| 4,968,144 A | 11/1990 | Thomas | |
| 4,972,077 A | 11/1990 | Willson | |
| 4,995,697 A | 2/1991 | Adamovsky | |
| 5,034,603 A | 7/1991 | Wilson | |
| 5,089,696 A | 2/1992 | Turpin | |
| 5,094,534 A | 3/1992 | Cole | |
| 5,119,024 A | 6/1992 | Popovic | |
| 5,128,537 A | 7/1992 | Halg | |
| 5,128,798 A | 7/1992 | Bowen | |
| 5,148,604 A | 9/1992 | Bantien | |
| 5,177,805 A | 1/1993 | Groger | |
| 5,187,546 A | 2/1993 | Johnston | |
| 5,202,939 A | 4/1993 | Belleville | |
| 5,202,969 A | 4/1993 | Sato | |
| 5,218,418 A | 6/1993 | Layton | |
| 5,218,426 A | 6/1993 | Hall | |
| 5,225,888 A | 7/1993 | Selwyn | |
| 5,239,400 A | 8/1993 | Liu | |
| 5,247,597 A | 9/1993 | Blacha | |
| 5,276,501 A | 1/1994 | Mc Clintock | |
| 5,283,625 A | 2/1994 | Bunn, Jr. | |
| 5,319,981 A | 6/1994 | Mei | |
| 5,351,317 A | 9/1994 | Weber | |
| 5,361,130 A | 11/1994 | Kersey | |
| 5,386,729 A | 2/1995 | Reed | |
| 5,392,117 A | 2/1995 | Belleville | |
| 5,400,140 A | 3/1995 | Johnston | |
| 5,401,956 A | 3/1995 | Dunphy | |
| 5,401,958 A | 3/1995 | Berkcan | |
| 5,420,688 A | 5/1995 | Farah | |
| 5,444,724 A | 8/1995 | Goto | |
| 5,451,772 A | 9/1995 | Narendran | |
| 5,473,428 A | 12/1995 | Lee | |
| 5,477,323 A | 12/1995 | Andrews | |
| 5,497,233 A | 3/1996 | Meyer | |
| 5,509,023 A | 4/1996 | Glance | |
| 5,526,114 A | 6/1996 | Eselun | |
| 5,550,373 A | 8/1996 | Cole | |
| 5,557,406 A | 9/1996 | Taylor | |
| 5,559,358 A | 9/1996 | Burns | |
| 5,631,736 A | 5/1997 | Thiel | |
| 5,641,956 A | 6/1997 | Vengsarkar | |
| 5,646,762 A | 7/1997 | Delavaux | |
| 5,647,030 A | 7/1997 | Jorgenson | |
| 5,657,405 A | 8/1997 | Fujiwara | |
| 5,682,237 A | 10/1997 | Belk | |
| 5,739,945 A | 4/1998 | Tayebati | |
| 5,760,391 A | 6/1998 | Narendran | |
| 5,784,507 A | 7/1998 | Holm-Kennedy | |
| 5,796,007 A | 8/1998 | Panagotopulos | |
| 5,818,586 A | 10/1998 | Lehto | |
| 5,835,214 A | 11/1998 | Cabib | |
| 5,835,645 A | 11/1998 | Jorgenson | |
| 5,847,828 A | 12/1998 | Downs | |
| 5,852,498 A | 12/1998 | Youvan | |
| 5,872,628 A | 2/1999 | Erskine | |
| 5,889,590 A | 3/1999 | Duggal | |
| 5,891,747 A | 4/1999 | Farah | |
| 5,910,840 A | 6/1999 | Furstenau | |
| 5,923,030 A | 7/1999 | Assard | |
| 5,926,591 A | 7/1999 | Labeye | |
| 5,929,990 A | 7/1999 | Hall | |
| 5,949,801 A | 9/1999 | Tayebati | |
| 5,986,749 A | 11/1999 | Wu | |
| 5,999,261 A | 12/1999 | Pressesky | |
| 5,999,262 A | 12/1999 | Dobschal | |
| 6,016,702 A | 1/2000 | Maron | |
| 6,020,963 A | 2/2000 | Di Marzio | |
| 6,057,911 A | 5/2000 | Reich | |
| 6,064,630 A | 5/2000 | Fersht | |
| 6,069,686 A | 5/2000 | Wang | |
| 6,075,613 A | 6/2000 | Schermer | |
| 6,078,706 A | 6/2000 | Nau | |
| 6,088,144 A | 7/2000 | Doerr | |
| 6,115,521 A | 9/2000 | Tran | |
| 6,118,534 A | 9/2000 | Miller | |
| 6,122,415 A | 9/2000 | Blake | |
| 6,137,621 A | 10/2000 | Wu | |
| 6,151,114 A | 11/2000 | Russell | |
| 6,157,025 A | 12/2000 | Katagiri | |
| 6,173,091 B1 | 1/2001 | Reich | |
| 6,178,001 B1 | 1/2001 | Kim | |
| 6,201,289 B1 | 3/2001 | Jou | |
| 6,212,306 B1 | 4/2001 | Cooper | |
| 6,223,262 B1 | 4/2001 | Mesh | |
| 6,272,926 B1 | 8/2001 | Fehrenbach et al. | |
| 6,281,976 B1 | 8/2001 | Taylor | |
| 6,282,215 B1 | 8/2001 | Zorabedian | |
| 6,289,143 B1 | 9/2001 | Berthold | |
| 6,304,686 B1 | 10/2001 | Yamate | |
| 6,328,647 B1 | 12/2001 | Traudt | |
| 6,330,255 B1 | 12/2001 | Hung | |
| 6,331,892 B1 | 12/2001 | Green | |
| 6,396,605 B1 | 5/2002 | Heflinger | |
| 6,422,084 B1 | 7/2002 | Fernald | |
| 6,425,290 B2 | 7/2002 | Willcox | |
| 6,439,055 B1 | 8/2002 | Maron | |
| 6,469,817 B1 | 10/2002 | Heflinger | |
| 6,486,984 B1 | 11/2002 | Baney | |
| 6,490,038 B1 | 12/2002 | Jung | |
| 6,492,636 B1 | 12/2002 | Chen | |
| 6,492,800 B1 | 12/2002 | Woods | |
| 6,496,265 B1 | 12/2002 | Duncan | |
| 6,501,551 B1 | 12/2002 | Tearney | |
| 6,522,797 B1 | 2/2003 | Siems | |
| 6,538,748 B1 | 3/2003 | Tucker | |
| 6,539,136 B1 | 3/2003 | Dianov | |
| 6,545,760 B1 | 4/2003 | Froggatt | |
| 6,549,687 B1 | 4/2003 | Kochergin | |
| 6,552,799 B1 | 4/2003 | Wright | |
| 6,563,968 B2 | 5/2003 | Davis | |
| 6,581,465 B1 | 6/2003 | Waters et al. | |
| 6,583,882 B2 | 6/2003 | Scruggs | |
| 6,594,022 B1 | 7/2003 | Watterson | |
| 6,597,458 B2 | 7/2003 | Tayag | |
| 6,603,560 B1 | 8/2003 | Islam | |
| 6,608,685 B2 | 8/2003 | Woods | |
| 6,612,174 B2 | 9/2003 | Sittler | |
| 6,621,258 B2 | 9/2003 | Davidson | |
| 6,633,593 B2 | 10/2003 | Ksendzov | |
| 6,636,321 B2 | 10/2003 | Bohnert | |
| 6,643,025 B2 | 11/2003 | Degertekin | |
| 6,647,160 B1 | 11/2003 | Chi | |
| 6,650,420 B2 | 11/2003 | Houston | |
| 6,667,935 B2 | 12/2003 | Vakoc | |
| 6,668,105 B2 | 12/2003 | Chen | |

| | | |
|---|---|---|
| 6,668,111 B2 | 12/2003 | Tapalian |
| 6,668,656 B2 | 12/2003 | Fernald |
| 6,680,472 B1 | 1/2004 | Thingbo |
| 6,687,011 B1 | 2/2004 | Lee |
| 6,687,036 B2 | 2/2004 | Riza |
| 6,690,873 B2 | 2/2004 | Bendett |
| 6,714,555 B1 | 3/2004 | Coldren |
| 6,714,700 B2 | 3/2004 | Burger |
| 6,717,965 B1 | 4/2004 | Hopkins |
| 6,735,224 B2 | 5/2004 | Murray |
| 6,741,357 B2 | 5/2004 | Wang |
| 6,747,743 B2 | 6/2004 | Skinner |
| 6,765,194 B2 | 7/2004 | Holz |
| 6,771,905 B1 | 8/2004 | Bortz |
| 6,776,049 B2 | 8/2004 | Johnson |
| 6,778,307 B2 | 8/2004 | Clark |
| 6,785,004 B2 | 8/2004 | Kersey |
| 6,791,694 B2 | 9/2004 | Pezeshki |
| 6,798,940 B2 | 9/2004 | Lee |
| 6,806,961 B2 | 10/2004 | Hill |
| 6,820,489 B2 | 11/2004 | Fernald |
| 6,822,979 B2 | 11/2004 | Daiber |
| 6,825,934 B2 | 11/2004 | Baney |
| 6,829,073 B1 | 12/2004 | Krol |
| 6,829,259 B2 | 12/2004 | Pontis |
| 6,838,660 B2 | 1/2005 | Duncan |
| 6,839,131 B2 | 1/2005 | Kwon |
| 6,842,254 B2 | 1/2005 | Van Neste |
| 6,850,461 B2 | 2/2005 | Maas |
| 6,879,421 B2 | 4/2005 | Clark |
| 6,882,428 B2 | 4/2005 | Baney |
| 6,886,365 B2 | 5/2005 | Rumpf |
| 6,886,404 B2 | 5/2005 | Digonnet |
| 6,894,787 B2 | 5/2005 | Youngner |
| 6,898,339 B2 | 5/2005 | Shah |
| 6,900,896 B2 | 5/2005 | Motamedi |
| 6,901,088 B2 | 5/2005 | Li |
| 6,901,176 B2 | 5/2005 | Balachandran |
| 6,904,070 B2 | 6/2005 | Pontis |
| 6,909,548 B2 | 6/2005 | Duggan |
| 6,915,048 B2 | 7/2005 | Kersey |
| 6,917,736 B1 | 7/2005 | Ersoy |
| 6,921,894 B2 * | 7/2005 | Swierkowski ......... 250/227.21 |
| 6,925,213 B2 | 8/2005 | Boyd |
| 6,940,588 B2 | 9/2005 | Woodside |
| 6,947,218 B2 | 9/2005 | Turner |
| 6,955,085 B2 | 10/2005 | Jones |
| 6,963,404 B2 | 11/2005 | Chang |
| 6,985,235 B2 | 1/2006 | Bao |
| 6,989,906 B2 | 1/2006 | Sandercock |
| 7,002,697 B2 | 2/2006 | Domash |
| 7,009,691 B2 | 3/2006 | Van Wiggeren |
| 7,016,047 B2 | 3/2006 | May |
| 7,019,837 B2 | 3/2006 | Waagaard |
| 7,043,102 B2 | 5/2006 | Okamoto |
| 7,046,349 B2 | 5/2006 | Everall |
| 7,047,816 B2 | 5/2006 | Jones |
| 7,065,108 B2 | 6/2006 | Park |
| 7,134,346 B2 | 11/2006 | Lopushansky |
| 7,139,295 B2 | 11/2006 | Tsai |
| 7,173,713 B2 | 2/2007 | Xu |
| 7,230,959 B2 | 6/2007 | Johnson |
| 7,305,158 B2 | 12/2007 | Jeffers |
| 7,317,739 B2 | 1/2008 | Chou |
| 7,355,684 B2 | 4/2008 | Jeffers |
| 7,355,726 B2 | 4/2008 | Jeffers |
| 7,405,829 B2 | 7/2008 | Shen |
| 7,492,463 B2 | 2/2009 | Lopushansky |
| 7,511,823 B2 | 3/2009 | Schultz |
| 2001/0013934 A1 | 8/2001 | Varnham |
| 2002/0015155 A1 | 2/2002 | Pechstedt |
| 2002/0041722 A1 | 4/2002 | Johnson |
| 2002/0063866 A1 | 5/2002 | Kersey |
| 2002/0109081 A1 | 8/2002 | Tarvin |
| 2002/0167730 A1 | 11/2002 | Needham |
| 2002/0186377 A1 | 12/2002 | Kuskovsky |
| 2003/0020926 A1 | 1/2003 | Miron |
| 2003/0025912 A1 | 2/2003 | Hui |
| 2003/0128917 A1 | 7/2003 | Turpin |
| 2003/0132375 A1 | 7/2003 | Blazo |
| 2003/0141440 A1 | 7/2003 | Kim |
| 2003/0159518 A1 | 8/2003 | Sawatari |
| 2004/0013356 A1 | 1/2004 | Wang |
| 2004/0113140 A1 | 6/2004 | Maida |
| 2004/0141184 A1 | 7/2004 | Ueki |
| 2004/0151438 A1 | 8/2004 | Ferguson |
| 2004/0196874 A1 | 10/2004 | Spiegelberg |
| 2004/0202399 A1 | 10/2004 | Kochergin |
| 2005/0046859 A1 | 3/2005 | Waagaard |
| 2005/0046862 A1 | 3/2005 | Melnyk |
| 2005/0073690 A1 | 4/2005 | Abbink |
| 2005/0105098 A1 | 5/2005 | Johansen |
| 2005/0213870 A1 | 9/2005 | Kersey |
| 2005/0218299 A1 | 10/2005 | Olsen |
| 2005/0231729 A1 | 10/2005 | Lopushansky |
| 2005/0231730 A1 | 10/2005 | Jeffers |
| 2005/0237538 A1 | 10/2005 | Belleville |
| 2005/0242096 A1 | 11/2005 | Jaghab |
| 2006/0034569 A1 | 2/2006 | Shih |
| 2006/0126070 A1 | 6/2006 | Kauppinen |
| 2006/0146337 A1 | 7/2006 | Hartog |
| 2006/0152733 A1 | 7/2006 | Waagaard |
| 2006/0274323 A1 | 12/2006 | Gibler |
| 2007/0006663 A1 | 1/2007 | Zerwekh |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043254 A1 | 2/2008 | Leitko et al. |
| 2008/0174781 A1 | 7/2008 | Berthold |
| 2008/0186506 A1 | 8/2008 | Lopushansky |
| 2008/0297808 A1 | 12/2008 | Riza |
| 2009/0056447 A1 | 3/2009 | Berthold |
| 2009/0086214 A1 | 4/2009 | Chin |

FOREIGN PATENT DOCUMENTS

| | | |
|---|---|---|
| DE | 3411096 A1 | 6/1983 |
| EP | 0397388 A2 | 11/1990 |
| EP | 0400939 A2 | 12/1990 |
| EP | 0452993 A2 | 10/1991 |
| EP | 0571107 A1 | 11/1993 |
| EP | 0549166 B1 | 10/1997 |
| EP | 0957345 A2 | 11/1999 |
| EP | 1586854 A2 | 10/2005 |
| GB | 1168971 | 10/1969 |
| WO | WO 94/28452 | 12/1994 |
| WO | WO 99/15858 | 4/1999 |
| WO | WO 2004/023071 A1 | 3/2004 |

OTHER PUBLICATIONS

Jeunhomme, "Single Mode Fiber Optics", Marcel, Dekker P., 1983, p. 100.

M.V. Andres, et al., "Optical Activation of a Silicon Vibrating Sensor", Electronics Letters, Oct. 9, 1986, vol. 22, No. 21.

M.J. Tudor, et al., "Silicon Resonator Sensors: Interrogation Techniques and Characteristics", IEEE Proceedings, Sep. 1988, vol. 135, Pt. D., No. 5.

Michael W. Putty, et al., "Process Integration for Active Polysilicon Resonant Microstructures: Sensors and Actuators", 1989, 20, pp. 143-151.

R.J. Pitcher, et al., "Optothermal Drive of Silicon Resonators; the Influence of Surface . . . " Feb. 1990, A21-A23, pp. 387-390; © Elsevier Sequoia/Printed in the Netherlands.

D.W. Burns, et al., "Thin Films for Micromechanical Sensors", Jul./Aug. 1990; J. Vac. Sci. Technol. A 8(4); ©1990 American Vacuum Society.

Udd, "Fiber Optic Sensors", 1991, pp. 147.

Diogenes Angelidis, et al., "Optical Micromachined Pressure Sensor for . . . ", Aug. 1992, Optical Engineering, vol. 31, No. 8; © Society of Photo-Optical Instrumentation Engineers.

K. Aratani et al., "Process and Design Considerations . . . " IEEE Mirco Electro Mechanical Systems Conference, Ft. Lauderdale, FL, pp. 230-235; © 1993 IEEE.

Kersey, Alan D., "Fiber Grating Sensors", Journal of Lightwave Technology, vol. 15, No. 8, © 1997 IEEE.

Clowes, J.R., et al., "Effects of High Temperature and Pressure . . . "; IEEE Photonics Technology Letters, vol. 10, No. 3; © 1998 IEEE.

J.M. Senior, "Multiplexing Techniques for Noninterferometric Optical Point-Sensor . . . ", A Review, Fiber and Integrated Optics, 17:3-20, © 1998 Taylor & Francis.

R.L. Johnson, et al., "Miniature Instrument for the Measurement . . . " Ctr for Astronomical Adaptive Optics, Steward Observatory, The Univ. of Arizona, vol. 3762, pp. 245-253. (undated).

K. Weir, et al., "Optical Fiber Sensor Technology", 2000, pp. 312-313.

Chi Chiu Chan, et al., "Performance Analysis of a Time-Division . . . " IEEE Journal of Selected Topics in Quantum Electronics, vol. 6, No. 5; © 2000 IEEE.

Weizhuo Li, et al., "Wavelength Multiplexing of Microelectromechanical . . . " Opt. Eng. 42(2), pp. 431-438; © 2003 Society of Photo-Optical Instrum. Engineers.

Fan-Gang Tseng, et al., "Polymer MEMS-Based Fabry-Perot Shear Stress Sensor", Dec. 2003, IEEE Sensors Journal, vol. 3, No. 6.

Trevor W. MacDougall, et al., "Large Diameter Waveguide Bragg Grating Components and Their Application . . . " 2004, Weatherford International.

* cited by examiner

FIBER OPTIC MEMS SEISMIC SENSOR WITH MASS SUPPORTED BY HINGED BEAMS

CROSS-REFERENCE TO RELATED APPLICATION

This application claims priority from U.S. Provisional Patent Application No. 60/794,948, filed on Apr. 26, 2006, and titled FIBER OPTIC MEMS SEISMIC SENSOR WITH MASS SUPPORTED BY HINGED BEAMS, which is hereby incorporated in its entirety by reference.

FIELD OF THE INVENTION

The present invention generally relates to mechanical optical devices, and, more particularly, to micro-electro-mechanical optical devices having a mass supported by hinged beams.

BACKGROUND

The traditional method for detecting land seismic signals has been the coil-type geophone. Geophone sensors consist of a mass-spring assembly contained in a cartridge about 3 cm long and weighing about 75 grams. In a typical geophone sensor, the spring is soft and as the cartridge case moves the mass (coil) is held in place by its own inertia. Thus, the coil acts as a reference for measurement of the cartridge displacement. This sensor arrangement is ideal for measurement of large, oscillatory displacements on the order of millimeters with sub-micrometer resolution. However, the frequency range of these sensors is limited. For best sensitivity to small displacements, a given sensor has a mechanical bandwidth of about 10 Hz. Sensors can be designed with center frequencies from 20 Hz to 100 Hz.

Micro-Electro-Mechanical Systems (MEMS) are miniature mechanical components fabricated in silicon wafers. The fabrication methods are based on the same photolithographic and etching processes used to manufacture electronic circuits in silicon. In fact, most MEMS devices include not only miniature mechanical components such as nozzles, gears, etc. but also integrated electronic components to provide local signal conditioning. Unfortunately, the integrated circuits limit the maximum operating temperature of electronic MEMS to 75° C. The maximum temperature limit can be extended to 400° C. or more if optical fiber sensors are integrated with mechanical MEMS components so that no electronics are needed in the high temperature environment.

Recently, MEMS accelerometers have been developed for 3-component (3C) land seismic measurements. In the MEMS accelerometer, a mass-spring assembly is also used, but, unlike the geophone, the spring is stiff and the mass moves with the case that houses the MEMS. The inertia of the mass causes strain and deflection of the spring and the deflection or strain that can be measured with a sensor to determine the acceleration of an object. Capacitance sensors may also be incorporated into high performance 3C MEMS accelerometers to determine the acceleration of an object.

The measurement range of accelerometers is specified in units of 'G' where 1G=9.8 m/s$^2$. Commercial specifications include 120 dBV dynamic range (1G to $10^{-6}$G) and 500 Hz mechanical bandwidth with 24-bit digital resolution equivalent to a noise limited performance of $10^{-7}$G/(Hz)$^{1/2}$. The accelerometer is fabricated on a silicon chip on the order of 100 mm$^2$. Three single-axis accelerometers (each with an application specific integrated circuit (ASIC) for signal conditioning) are packaged to measure in three orthogonal directions. The limitation of these accelerometers is an upper limit on the operating temperature of 75° C., which is imposed by the electronic integrated circuits and is not a fundamental limitation of silicon itself.

SUMMARY OF INVENTION

The present invention relates to a proof mass supported by a frame having supporting beams. The proof mass is positioned within the frame and has a hinged attachment to the beams. The proof mass has a sensor gap having a first reflector and a second reflector positioned at opposing ends of the sensor gap. An optical fiber injects light into the sensor gap and light is reflected to determine seismic movement of the proof mass with respect to the frame. Stops are provided for limiting the movement of the proof mass to minimize strain on the attachment of the beams and the proof mass.

DESCRIPTION OF THE DRAWINGS

Operation of the invention may be better understood by reference to the following detailed description taken in connection with the following illustrations, wherein.

DETAILED DESCRIPTION

Figure 1:
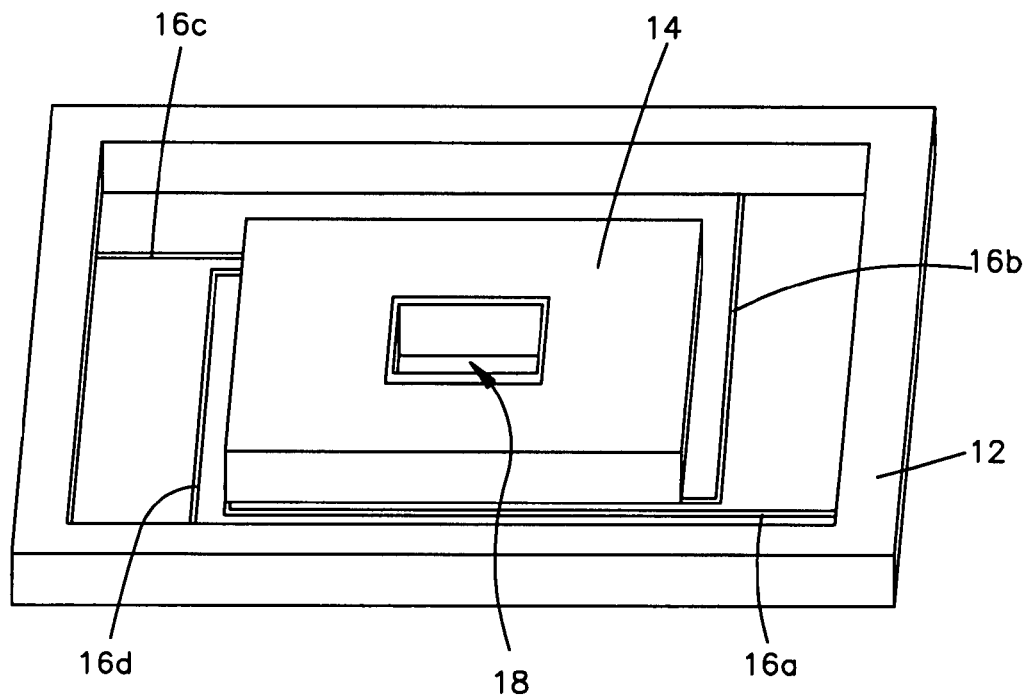
FIG. 1 is a perspective view of a proof mass supported by hinged support beams in an embodiment of the present invention.

While the present invention is described with reference to the embodiments described herein, it should be clear that the present invention should not be limited to such embodiments. Therefore, the description of the embodiments herein is illustrative of the present invention and should not limit the scope of the invention as claimed.

respect to the frame 12. In an embodiment, the proof mass 14 moves in the y-direction as shown in FIG. 1.

Figure 2A:
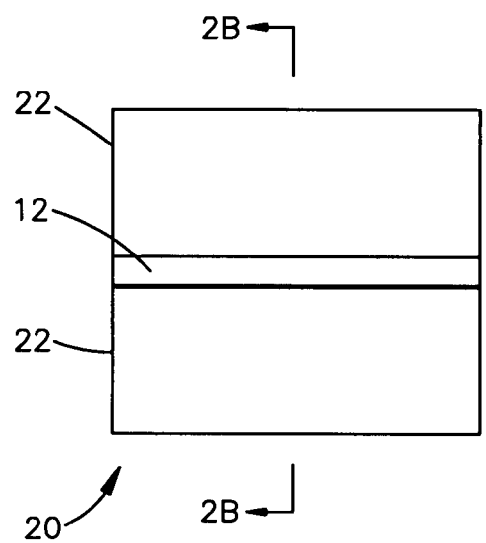
FIG. 2A is a side perspective view of an assembled MEMS die in an embodiment of the present invention.

FIG. 2A illustrates a side perspective view of a MEMS die 20 in an embodiment of the present invention. In the embodiment of the invention illustrated in FIG. 2, the frame 12 is made of silicon and positioned between glass wafers 22. In a preferred embodiment, the glass wafers 22 are borosilicate glass and are bonded to the top and the bottom surface of the frame 12. The glass wafers 22 as referred herein should not be deemed as limited to glass or borosilicate glass and may be any other materials as will be appreciated by one of ordinary skill in the art.

Figure 2B:
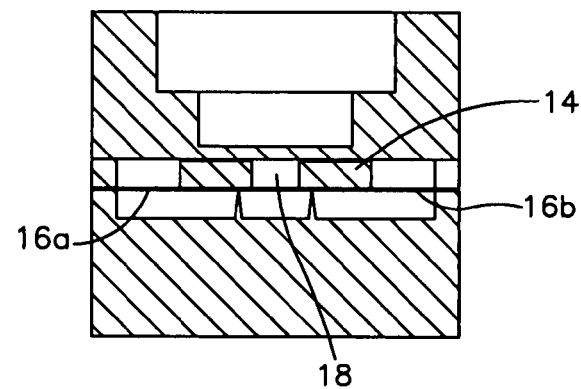
FIG. 2B is a cross-sectional view taken generally along line A-A of the assembled MEMS die of FIG. 2A.
Figure 3:
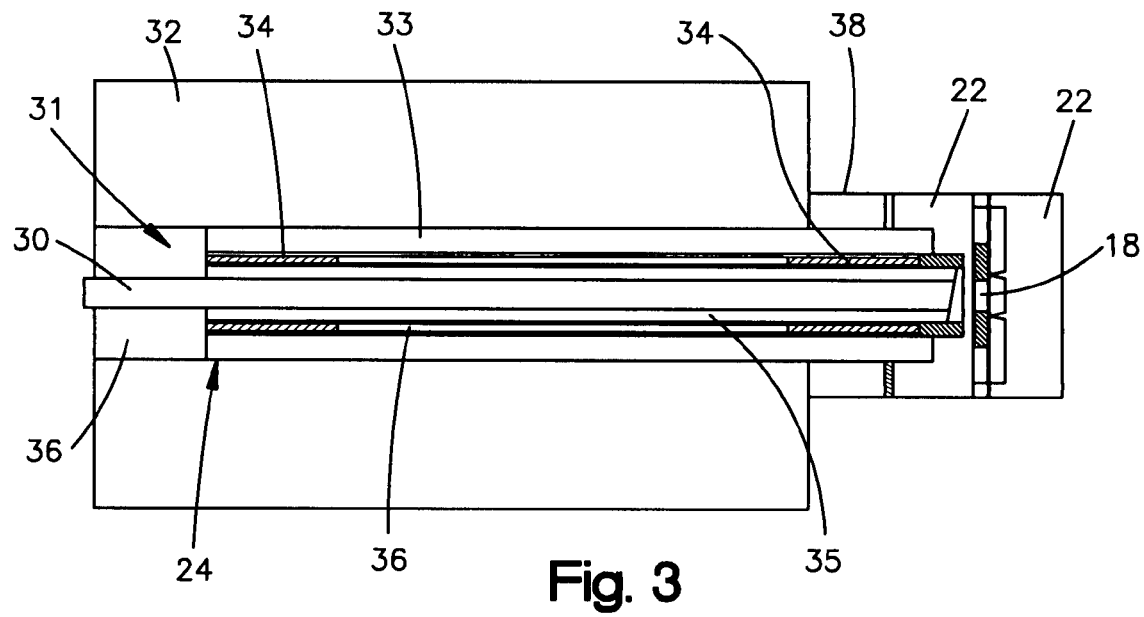
FIG. 3 is a cross-sectional view of a sensor assembly in an embodiment of the present invention.

A cross-sectional view taken generally along line A-A of the MEMS die 20 is illustrated in FIG. 2B. An optical fiber assembly 24 can be inserted into hole 24 in glass wafer 22 to direct light to the hole 18 of the proof mass 14 as shown in FIG. 3. In this embodiment, the beams 16a and 16b having a uniform thickness are shown in FIG. 2B. The glass wafers 22 are illustrated on opposing sides of the frame 12.

The proof mass 14 moves freely in the ±y direction with respect to the frame 12. The configuration and performance of the sensor assembly 10 in an embodiment where the sensor assembly 10 is silicon are provided in Table 1.

TABLE 1

Performance and Dimensional Summary

| Deflection (nm) | Resonance $f_n$ (Hz) | Proof Mass Length & Width (mm) | Proof Mass Thickness (mm) | Length of Beam & Hinge (mm) | Support Beam Width (mm) | Support Beam Thickness (mm) | Max Stress (Pa) | E* (GPa) |
|---|---|---|---|---|---|---|---|---|
| 1757 | 376 | 0.64 | .088 | .890 | 0.008 | .004 | $24 \times 10^6$ | 190 |

*E is Young's modulus for silicon.

The present invention relates to a micro-electro mechanical system (MEMS) sensor. More specifically, the present invention relates to an interferometric MEMS optical sensor that may be used for seismic sensing. In an embodiment of the invention, the components of the optical seismic sensor are positioned to form an interferometric gap.

FIGS. 1 and 3 illustrate a frame 12 supporting beams 16a-16d and a proof mass 14 that may be incorporated into a sensor assembly 10. The beams 16a-16d support the proof mass 14 that may be positioned within the frame 12. In an embodiment, the proof mass 14 and the beams 16a-16d are made of silicon. One of ordinary skill in the art will appreciate that other materials may be used and that the present invention is not deemed as limited to any specific type of material. The beams 16a-16d are secured to the frame 12 to provide a stable and robust arrangement of the sensor assembly 10.

At an end of the beams 16a-16d opposite the frame 12, the beams 16a-16d are secured to the proof mass 14, as illustrated in FIG. 1. In a preferred embodiment, the beams 16a-16d are secured to the proof mass 14 with hinges and/or secondary beams. To this end, the hinged attachment of the beams 16a-16d to the proof mass 14 allows the proof mass 14 to move freely with respect to the beams 16a-16d. The beams 16a-16d are secured to the proof mass 14 at corners of the proof mass 14. In addition, the beams 16a-16d may have a uniform thickness between the frame 12 and the proof mass 14.

A hole 18 is etched or otherwise formed in the proof mass 14. The hole 18 is a flat-bottom hole in the proof mass 14. The beams 16a-16 supporting the proof mass 14 are attached such that the proof mass 14 and, thus, the hole 18 moves with FIG. 3 illustrates an assembled view of the sensor 10 in an embodiment of the present invention. The optical fiber assembly 31 has an optical fiber 30 held within the optical fiber assembly 31. The optical fiber 30 extends toward the hole 18 to transmit light to and/or receive reflected light from the hole 18 in the proof mass 14. A first tube 32 houses the optical fiber assembly 31. The optical fiber assembly is contained within a second tube 33. The optical fiber 30 is contained within tube 35 and both optical fiber and tube 35 are held within tube 33 and extend through the outer tube 32 and toward the hole 18. The end of tube 33 fits within the hole in first glass wafer 22. In an embodiment, two tubes 34 are positioned within the tube 33 at each end tube 35 to center tube 35 within tube 33. The tubes 32-35, may be made of metal, glass and/or a suitable material for housing the optical fiber assembly 31.

A material 36 is positioned adjacent to an end of the first tube 32. The material 36 may also be positioned between tube 33 and tube 35 in the region between tubes 34. In a preferred embodiment, the member 36 is rubber, for example, silicone rubber. A plate 38 is positioned at an opposite end of the first tube 32 and opposite from the member 36. The plate 38 is positioned between the first glass wafer 22 and the first tube 32. The optical fiber assembly 31 may extend through the plate 38 toward the hole 18. In an embodiment, the plate 38 is metal and is welded to tube 32. A solder 41 is provided for bonding or otherwise securing the first glass wafer 22 and the plate 38. The solder 41 may be made of various materials as known to one of ordinary skill in the art.

Figure 4:
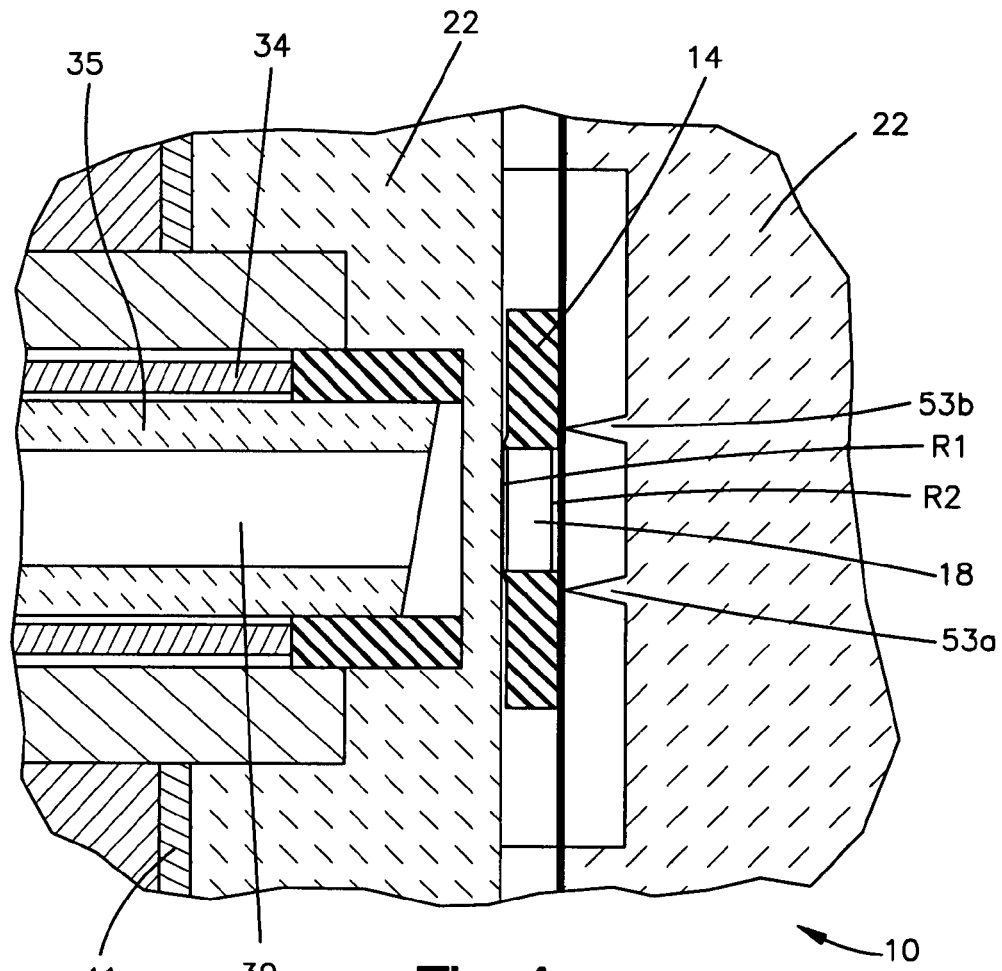
FIG. 4 is a diagrammatical view of a fiber optic sensor with a proof mass supported by hinged beams in an embodiment of the present invention.

An optical fiber 30 injects light into the sensor assembly 10. For example, the optical fiber 30 may inject light in the C band (at approximately 1550 nm) remotely by a signal conditioner/interrogator. Light exits the end of the optical fiber 30 as illustrated in FIG. 4. The end of optical fiber 30 and the end of tube 35 are polished at an angle greater that 6° to the normal to reduce back reflection into the optical fiber 30.

Light is transmitted to the flat-bottom hole 18 and a portion of the light is reflected by reflector R1, as illustrated in FIG. 4. The portion of the light reflected from the reflector R1 is indicated as Beam A. The R1 surface is the inner surface of first glass wafer 22, which may be a glass surface, such as, a borosilicate glass surface. In an embodiment, a coating may be applied onto the reflector R1 surface to increase the reflectance. The amount of reflectance of the reflector R1 may be set to a predetermined level by, for example, selecting a substance and/or a coating for the glass surface that provides the predetermined level of reflectance.

Light not reflected at the reflector R1 travels to reflector R2 and is reflected as illustrated in FIG. 4. The light reflected from the reflector R2 is indicated as Beam B. Beam B is reflected by the surface at the bottom of flat-bottom hole 18. The sensor gap is defined by the separation between the reflector R1 and the reflector R2. In a preferred embodiment, the reflectance of the reflector R2 is greater than the reflectance of the reflector R1. In such an embodiment, the reflector R2 is a coating that increases the reflectance. For example, in an exemplary embodiment, the reflector R2 is a gold coating. The reflector R2 is positioned and/or deposited and thus is bonded to the proof mass 14 at the bottom of flat-bottom hole 18.

Other materials may be chosen for the reflectors R1 and R2 as shown in FIG. 4. In an embodiment, bare borosilicate glass (having a 3.7% reflectance) is used for the reflector R1, but other materials may be used to increase the reflectance. For example, a high index-low index dielectric stack may be used for the reflector R1 to increase the reflectance to 40% or more, if desired. In addition, materials other than the gold coating for the reflector R2 may be used. For example, aluminum, silver and/or a dielectric stack may be used to obtain a high reflectance for the reflector R2. The present invention should not be deemed as limited to any specific material for the reflectors R1 and R2.

Movement of the proof mass 14 with respect to the frame 12 changes the sensor gap defined as the separation between reflectors R1 and R2. The Beams A and B reflect back into the optical fiber 30 and may, for example, interfere on the surface of a photodiode detector in the signal conditioner (not shown). The interference signal of the Beams A and B is analyzed to precisely determine the sensor gap. The sensor 10 is, therefore, capable of sensing seismic movement.

FIGS. 5-14 illustrate a method of manufacturing and/or fabricating the sensor 10. The method of manufacturing the sensor 10 as set forth in FIGS. 5-14 is provided as an example, and other methods of fabricating the sensor 10 as known by one of ordinary skill in the art are contemplated. FIGS. 5-14 illustrate fabricating the sensor 10 using wafer processing technology, such as, for example, masking, etching and bonding methods.

Figure 5:
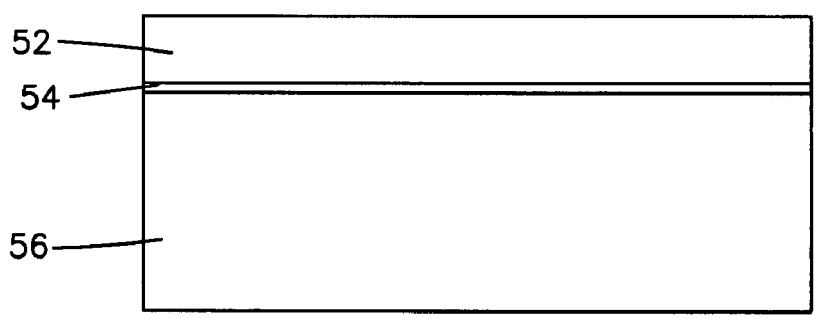
FIG. 5 is a cross-sectional view of a silicon-on-insulator wafer in an embodiment of the present invention.

FIG. 5 illustrates a wafer 50, such as a silicon wafer, for masking, etching and/or bonding to fabricate the sensor 10. The wafer 50 has a first layer 52, a second layer 54 and a third layer 56. The second layer 54 is positioned between the first layer 52 and the third layer 56. In a preferred embodiment, the first layer 52 is silicon, such as, silicon epitaxial ("EPI"); the second layer 54 is silicon dioxide; and the third layer 56 is a silicon handle layer that is removable from the first layer 52 and the second layer 54. The particular materials and substances of the wafer 50 and the layers 52, 54, 56 are provided as mere examples of one embodiment of the invention. Other materials and substances may be used to fabricate the sensor 10.

Figure 6:
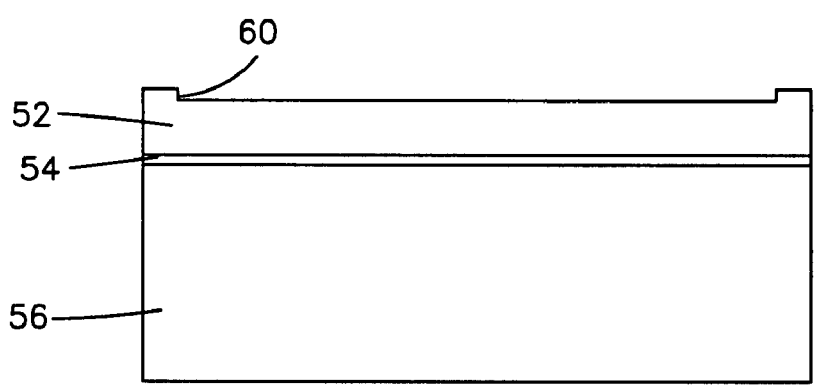
FIG. 6 is a cross-sectional view of a silicon wafer etched to define a thickness of a proof mass in an embodiment of the present invention.
Figure 7:
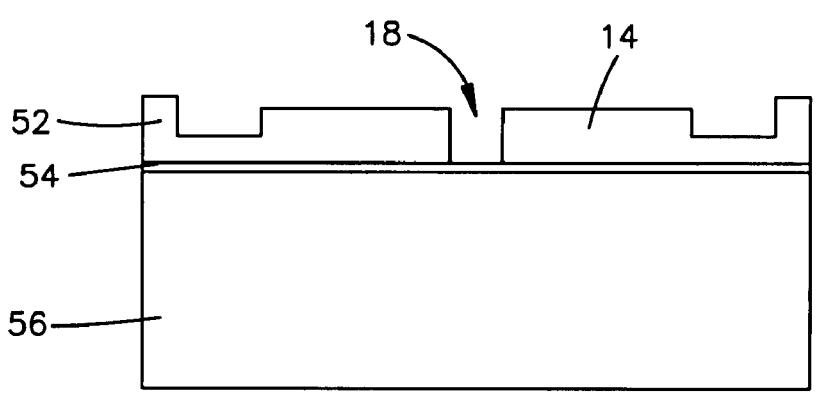
FIG. 7 is a cross-sectional view of a silicon wafer etched to define a hole in an embodiment of the present invention.
Figure 8:
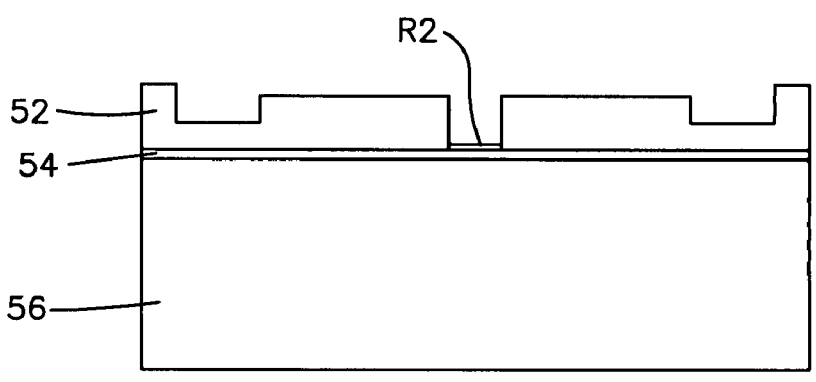
FIG. 8 is a cross-sectional view of a silicon wafer having a reflector deposited on glass at the bottom of a hole in an embodiment of the present invention.
Figure 9:
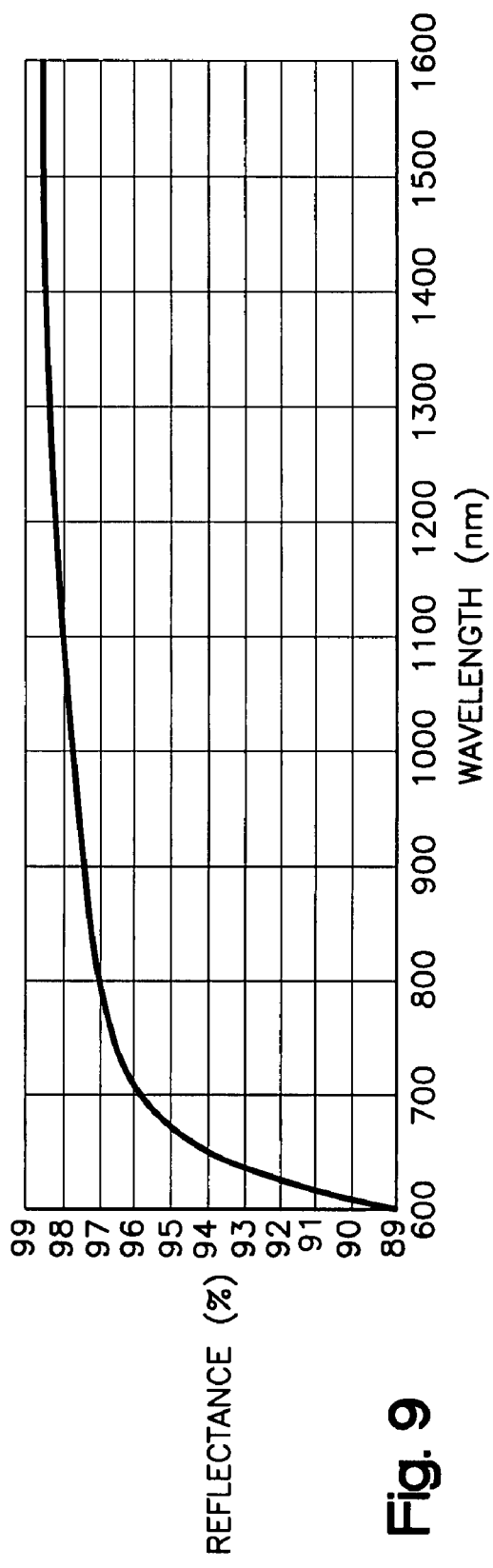
FIG. 9 is a graphical representation of the reflectance versus wavelength of a gold coating reflector on glass in an embodiment of the present invention.

As illustrated in FIG. 6, the first layer 52 may be etched to define a depth 60 of the first layer 52 and/or the proof mass 14. FIG. 7 illustrates etching or otherwise defining the depth of the hole 18, a perimeter of the proof mass 14 and/or a thickness of the beams 16a-16d. The reflector R2 is deposited at the bottom of 18 as illustrated in FIG. 8. In this embodiment, the reflector R2 is a gold coating, such as chromium-gold coating, and is deposited at the bottom of hole 18. For example, the reflector R2 is deposited on the second silicon dioxide layer 54 at the bottom of hole 18. FIG. 9 illustrates a graph of the percentage of reflectance of the reflector R2 on the second layer 54 at given wavelengths of the light transmitted from the optical fiber 30. More specifically, FIG. 9 is shown where the reflector R2 is a chromium-gold coating deposited on layer 54 which is silicon dioxide.

Figure 10:
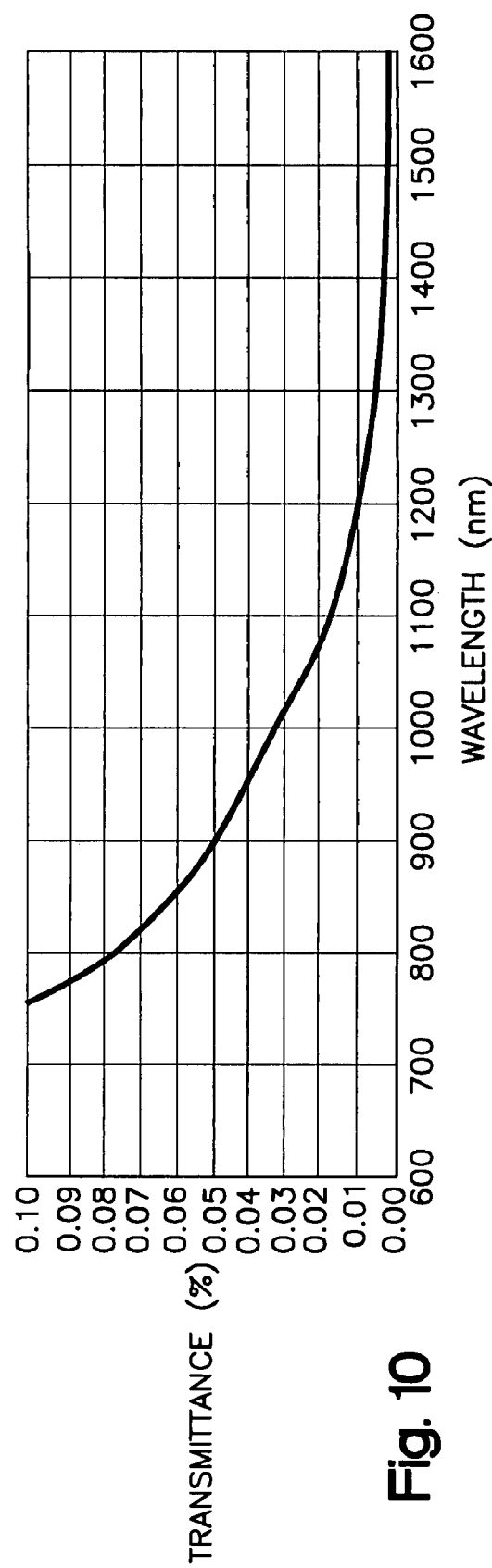
FIG. 10 is a graphical representation of the transmittance versus wavelength for a gold coating on glass in an embodiment of the present invention.
Figure 11:
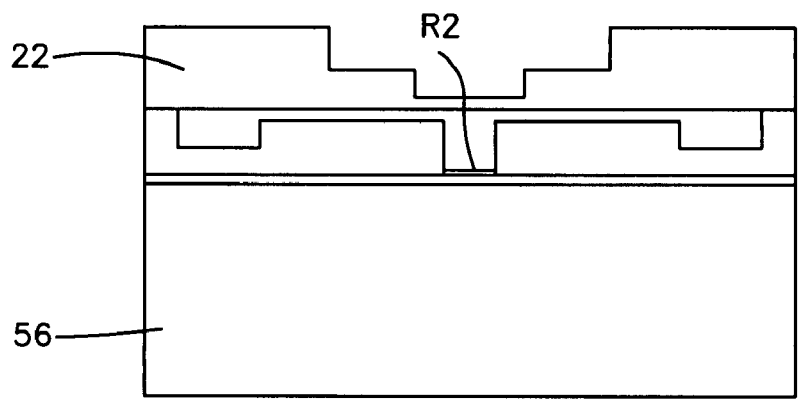
FIG. 11 is a cross-sectional view of a silicon wafer having a glass surface bonded to a frame in an embodiment of the present invention.

FIG. 10 illustrates a graph of the transmittance of the light from the optical fiber 30 through the reflector R2 where the reflector R2 is a chromium-gold coating. As illustrated, the transmittance is low such that substantially all of the light will be reflected from the reflector R2 in this embodiment. FIG. 11 illustrates etching and/or drilling of the first glass wafer 22 and anodic bonding attachment of first glass wafer 22 onto the first layer 52. The first glass wafer 22 is preferably borosilicate glass but other materials for transmitting light to the bottom of hole 18 may be used. The first glass wafer 22 as illustrated in FIG. 11 may have a counterbored configuration (tiered orientation), for example, a first larger hole sized to receive tube 33 and a second cut-out sized to receive tube 35 of the optical fiber assembly 31. In a preferred embodiment, the glass wafer 22 is sized and shaped to receive the optical fiber assembly 31.

Figure 12:
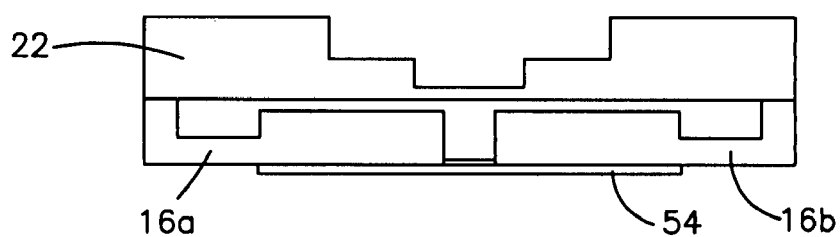
FIG. 12 is a cross-sectional view of a silicon wafer having a third layer etched to expose a perimeter of a proof mass in an embodiment of the present invention.
Figure 13:
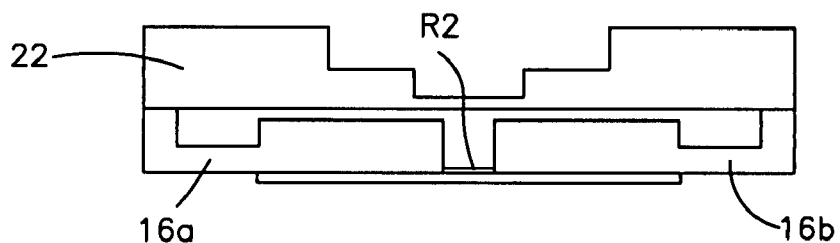
FIG. 13 is a cross-sectional view of a silicon wafer etched to release beams supporting a proof mass in an embodiment of the present invention.

FIG. 12 illustrates etching or otherwise removing the third (handle) layer 56 and a portion of the second layer 54. As shown, the second layer 54 is etched to remove the second layer 54 from the frame 12 and the beams 16a-16d. FIG. 13 illustrates etching or otherwise partially removing the first layer 52 to detach or release the beams 16a-16d from the first layer 52.

Figure 14:
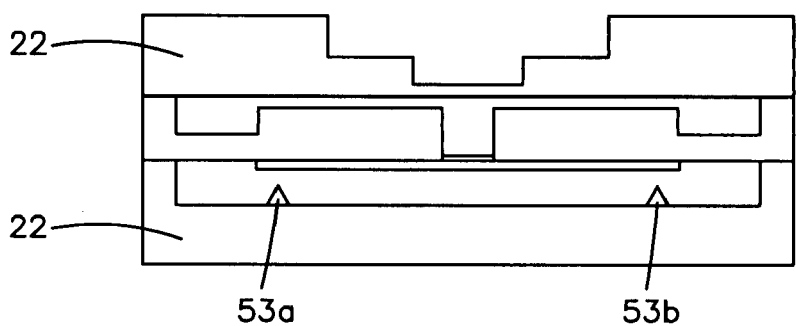
FIG. 14 is a cross-sectional view of a silicon wafer having a glass surface with stops bonded to a the wafer in an embodiment of the present invention.

The second glass wafer 22 is bonded to the perimeter of the first layer 52 at the frame 12 as shown in FIG. 14. The second glass wafer 22 has stops 53a, 53b that are etched into the glass wafer 22 to limit the movement of the proof mass 14. The second glass wafer 22 is preferably borosilicate glass and anodically bonded to the frame 12. For example, the stops 53a, 53b will limit the movement of the proof mass 14 to a predetermined distance to prevent excessive stress and possible breakage and failure of the beams 16a-16d.

Figure 18:
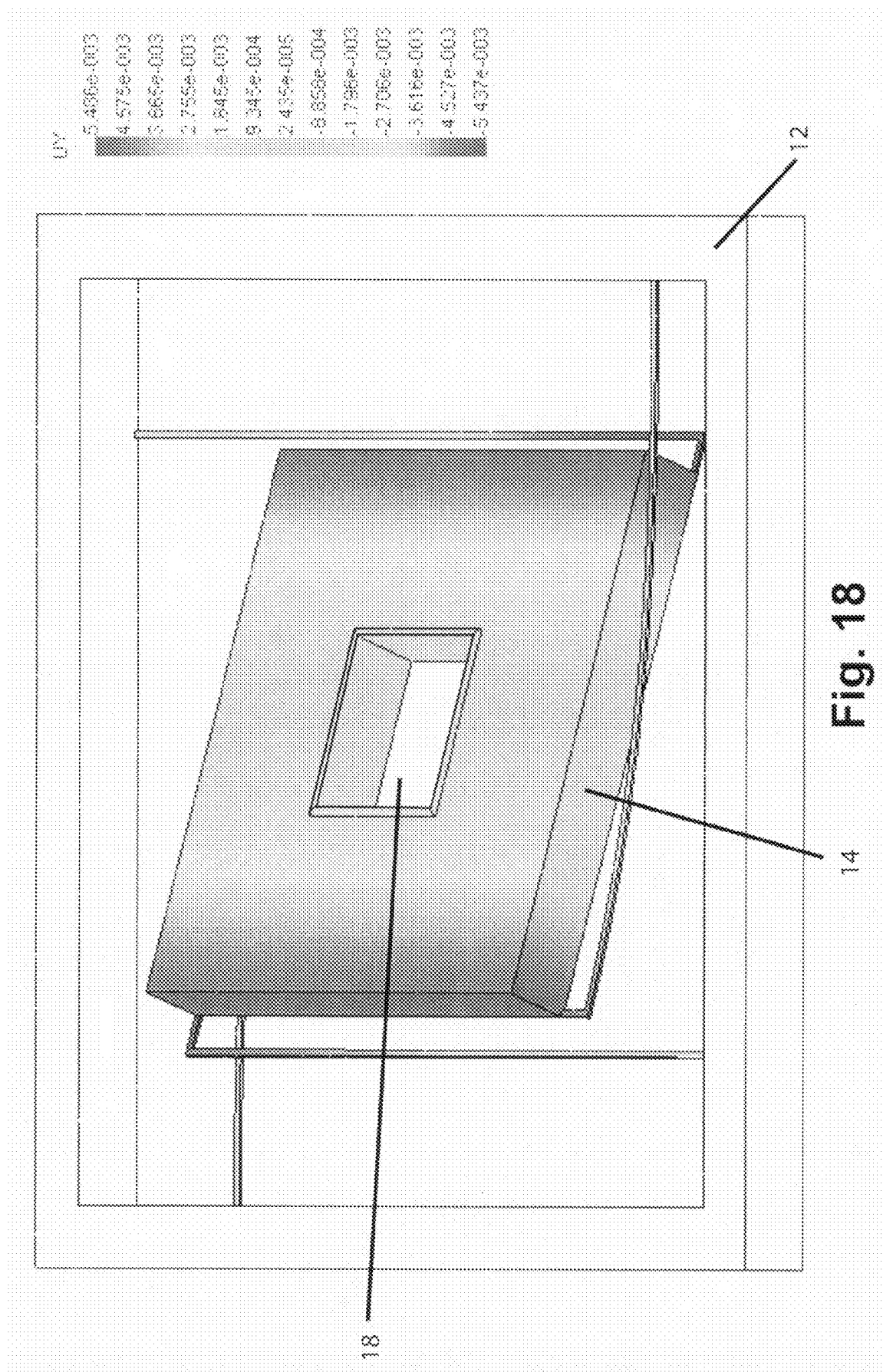
FIG. 18 is a graphical representation of a finite element stress analysis of a silicon proof mass supported by hinged support beams in an embodiment of the present invention.

FIG. 18 illustrates the stops 53a, 53b limiting the displacement of the proof mass 14. A lateral shock of approximately 1500 g is applied in the x-direction and the stops 53a, 53b limit the displacement of the proof mass 14 in the y-direction. In a preferred embodiment, the proof mass 14 is limited to a displacement of approximately five micrometers in the y-direction. The finite element stress analysis of FIG. 18 illustrates that the stress on the hinged attachment of the beams 16a-16d to the proof mass 14 is maintained at or below approximately $24 \times 10^6$ Pa or about 0.3% of the of the tensile strength of silicon.

Figure 15:
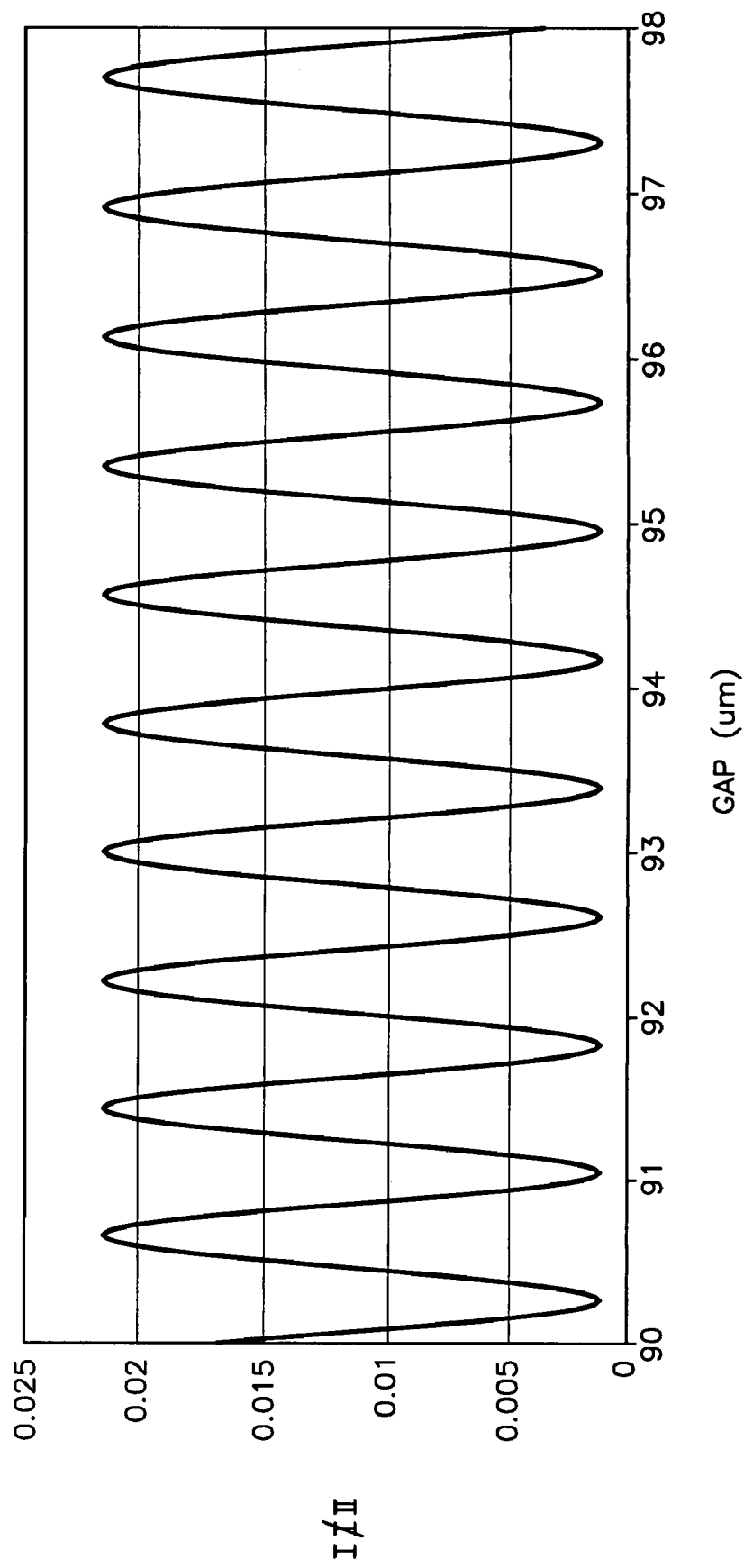
FIG. 15 is a graphical representation of an interference signal versus gap for two light beams reflected by a reflector R1 and a reflector R2 in an embodiment of the present invention.

FIG. 15 illustrates a graph of the light intensity ratio (or interference signal) versus the sensor gap for the Beams A and B. In this illustration, the reflector R1 has a 3.7% reflectance, the reflector R2 has a reflectance of 98.5% and the light from the optical fiber 30 is in the C band range.

Figure 16:
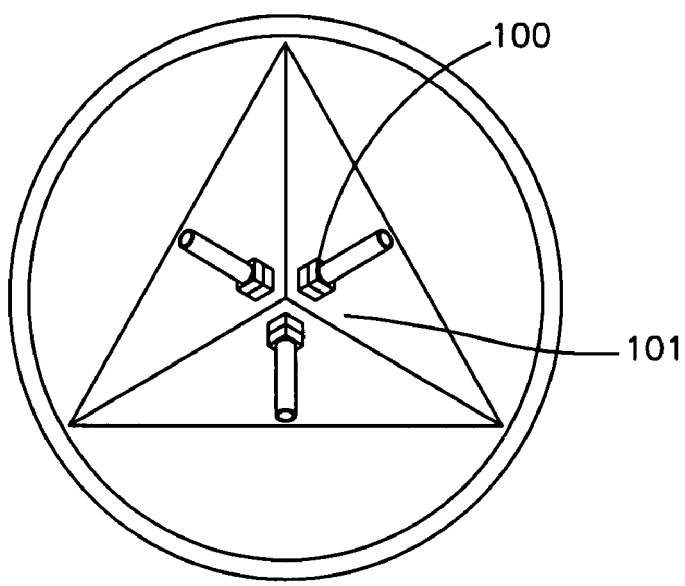
FIG. 16 is a perspective view of the first embodiment of the triaxial assembly, where three sensors are mounted on the three mutually perpendicular surfaces at the apex of a corner of a cube in an embodiment of the present invention.
Figure 17:
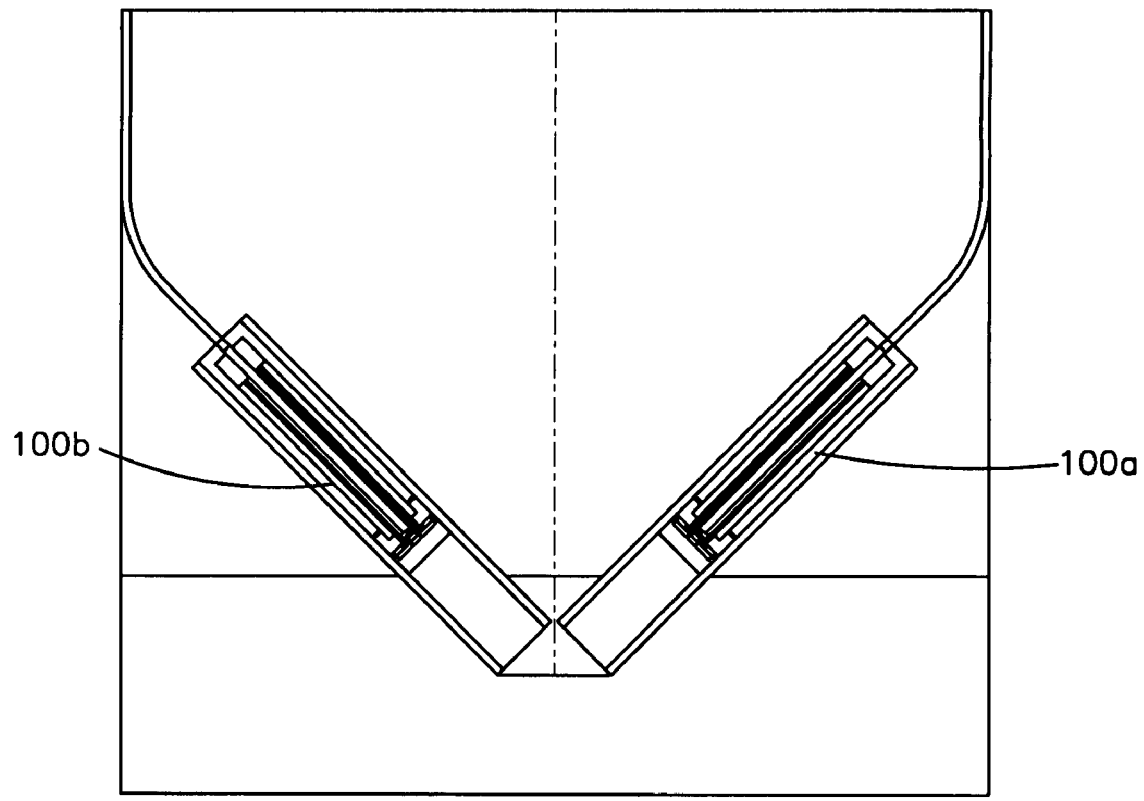
FIG. 17 is a perspective view of an alternative embodiment of the triaxial assembly, where two sensors are shown, the third sensor would exit the page and be perpendicular to the two sensors shown.

In use, the sensor 10 may be attached and/or secured in various orientations to accurately determine seismic movement. FIG. 16 illustrates a triaxial assembly of the sensors 100 attached to the corner of a cube 101. In this embodiment, the sensors 100 are positioned on three mutually perpendicular surfaces at the apex of corners of the cube 101. FIG. 17 illustrates another embodiment of the orientation of the sensors 100 where two sensors 100a, 100b are positioned at adjacent edges perpendicular to each other. The third sensor (not shown) is positioned out of the page and mutually perpendicular to the sensors 100a, 100b.

The invention has been described above and, obviously, modifications and alternations will occur to others upon a reading and understanding of this specification. The claims as follows are intended to include all modifications and alterations insofar as they come within the scope of the claims or the equivalent thereof

Having thus described the invention, we claim:

1. A fiber optic MEMS seismic sensor comprising:
a frame;
a proof mass supported by the frame, the proof mass having a hole formed therein, the hole movable with respect to the frame; and
a sensor gap defined between a first reflector and a second reflector, the first reflector located adjacent the proof mass at a first end of the hole, the second reflector located at an opposite end of the hole, wherein the second reflector is bonded to the proof mass.

2. The seismic sensor of claim 1 wherein the frame has a plurality of beams extending to support the proof mass within the frame.

3. The seismic sensor of claim 2 wherein the plurality of beams have a hinged attachment to the proof mass.

4. The seismic sensor of claim 2 further comprising:
a borosilicate glass wafer bonded to a top surface of the frame.

5. The seismic sensor of claim 1 further comprising:
a glass wafer bonded to a bottom surface of the frame, the glass having stopping members for limiting the movement of the proof mass.

6. The seismic sensor of claim 5 wherein the substance is borosilicate glass.

7. The seismic sensor of claim 1 further comprising:
an optical fiber transmitting light to the sensor gap of the proof mass.

8. The seismic sensor of claim 7 wherein the reflector on glass wafer adjacent to proof mass only transmits a portion of the light into the sensor.

9. The seismic sensor of claim 7 further comprising:
an angle polish on the end of the fiber to prevent back reflection.

10. A fiber optic MEMS sensor, the sensor comprising:
a frame having supporting beams extending therefrom;
a proof mass having a hinged attachment to the beams, the proof mass movable with respect to the frame, the proof mass having a hole formed therein, the hole is an aperture extending through the proof mass to a silicon dioxide surface at bottom of proof mass; and
an optical assembly injecting light into the hole, wherein the hole has a coating at an end distal to the optical assembly, the coating capable of reflecting a portion of the light to determine a sensor gap.

11. The sensor of claim 10 wherein the coating is a gold coating.

12. The sensor of claim 10 further comprising:
a stopping member connected to the frame, the stopping member limiting movement of the proof mass.

13. The sensor of claim 10 further comprising:
a borosilicate glass material bonded to a top surface and a bottom surface of the frame, the borosilicate glass material on top surface reflecting a portion of the light from the optical fiber assembly back into the optical assembly.

14. The sensor of claim 13 further comprising:
a reflective coating on the borosilicate glass surface adjacent to the proof mass, wherein the reflective coating reflects substantially more of the light from the optical assembly than the borosilicate glass material.

15. The sensor of claim 14 wherein the optical assembly extends into the borosilicate glass material bonded to the top surface of the frame.

16. A method of manufacturing a MEMS fiber optic sensor comprising the steps of:
providing a silicon wafer having a plurality of layers;
etching a first layer of the wafer to define a sensor gap cavity, a proof mass and a frame, a portion of the sensor gap being a hole extending through the first layer of the wafer and the proof mass, the frame having beams positioned to support the proof mass; and
depositing a reflective coating on the bottom of the hole in the proof mass.

17. The method of claim 16 wherein the reflective coating contains gold.

18. The method of claim 17 further comprising:
anodically bonding borosilicate glass to the frame.

19. The method of claim 18 wherein the borosilicate glass has stops for limiting the movement of the proof mass with respect to the frame.

20. The method of claim 16 wherein the beams have a hinged attachment to the proof mass.

* * * * *